(12) United States Patent
Krahl et al.

(10) Patent No.: US 7,581,298 B2
(45) Date of Patent: Sep. 1, 2009

(54) METHOD OF MAKING A SEALING TOOL

(75) Inventors: Wolfgang Krahl, Laupheim (DE); Günter Felk, Ulm-Einsingen (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 210 days.

(21) Appl. No.: 11/799,096

(22) Filed: Apr. 30, 2007

(65) Prior Publication Data

US 2008/0010803 A1    Jan. 17, 2008

(30) Foreign Application Priority Data

Apr. 28, 2006    (DE) .................. 10 2006 020 453

(51) Int. Cl.
*G01M 19/00* (2006.01)
*B65B 51/10* (2006.01)

(52) U.S. Cl. .............. 29/407.01; 29/407.05; 29/407.08; 156/581

(58) Field of Classification Search .............. 29/407.01, 29/407.05, 407.08, 405, 17.1, 17.2; 73/862.381, 73/862.451, 862.53; 53/548; 156/581

See application file for complete search history.

(56) References Cited

U.S. PATENT DOCUMENTS

| | | | | |
|---|---|---|---|---|
| 1,994,388 A | * | 3/1935 | Erichsen | 73/862.636 |
| 3,826,701 A | | 7/1974 | Miller | 156/64 |
| 4,586,317 A | | 5/1986 | Bussell | 53/451 |
| 5,067,302 A | | 11/1991 | Boeckmann | 53/374.8 |
| 5,070,675 A | * | 12/1991 | Chuan-Shiang | 53/79 |
| 5,076,040 A | | 12/1991 | Davis | 53/551 |
| 5,475,964 A | * | 12/1995 | Fiesser et al. | 53/75 |
| 2006/0090841 A1 | * | 5/2006 | Worden | 156/228 |

* cited by examiner

*Primary Examiner*—Jermie E Cozart
(74) *Attorney, Agent, or Firm*—Andrew Wilford

(57) ABSTRACT

Sealing tools are used in a machine in which foils are guided between two sealing tools that on their sides facing the foil have bumps with uniform relative spacing T. Compensation for the tolerances between the sealing tools and the foils is achieved for a defined penetration depth of the bumps into the foil workpiece. The spacing T of the bumps is predetermined, and subsequently an experimental measurement of the force $\sigma_{DS}$ is carried out that is necessary for the defined penetration depth of a test body of known geometry into the foils. Then, and with use of the force $\sigma_d$ applied by the sealing machine that is determined as the quotient of the forces applied to the sealing tools per surface unit of measure of the sealing tools, the corrugated surface A required for the defined penetration depth is set based on the relation $$A = \sigma_d * T^2 / \sigma_{Ds}.$$

3 Claims, 2 Drawing Sheets

METHOD OF MAKING A SEALING TOOL

FIELD OF THE INVENTION

The present invention relates to a sealing tool. More particularly this invention concerns a method of determining the bump size of the sealing tools used in a sealing machine.

BACKGROUND OF THE INVENTION

A standard sealing machine has a pair of sealing tools each formed with an array normally uniformly distributed bumps. The tools are heated and pressed together to opposite sides of a pair of thermoplastic foils to laminate them together, with each of the bumps pressing a predetermined depth, which is substantially less than the foil thickness, into the respective face of the foils.

The problem with designing such tools is that it is normally a hit and miss job determining the spacing between the bumps. This spacing varies with their area, the pressures used and so on. Thus it is standard simply to make up a tool, try it out, then remachine or replace it as necessary until the desired pattern and sealing is obtained. The result is often a tradeoff between product quality, that is how good the seal is, and the work in designing the sealing tools.

OBJECTS OF THE INVENTION

It is therefore an object of the present invention to provide an improved method of making a sealing tool.

Another object is the provision of such an improved method of making a sealing tool that overcomes the above-given disadvantages, in particular that allows the tool to be designed accurately so that, without extensive trials, a tool is produces that makes a perfect seal.

SUMMARY OF THE INVENTION

According to the invention sealing tools are produced for use in a sealing machine, particularly in a thermoforming machine, in which foils are guided between two sealing tools that on their sides facing the foil have bumps with uniform relative spacing T. Compensation for the tolerances between the sealing tools and the foils is achieved for a defined penetration depth of the mutually opposing bumps in the foil workpiece. The spacing T of the bumps is predetermined, and subsequently an experimental measurement of the compressive force $\sigma_{DS}$ is carried out that is necessary for the defined penetration depth of a test body having a known geometry into the foil workpiece. Then, and with use of the compressive force $\sigma_d$ applied by the sealing machine that is determined as the quotient of the forces applied to the sealing tools per surface unit of measure of the sealing tools, the corrugated surface A required for the defined penetration depth is set based on the relation $$A = \sigma_d * T^2 / \sigma_{Ds}.$$

The use of the sealing tools produced according to this manufacturing method offers the advantage that optimal tolerance compensation can be determined in advance by designing the bump geometry as a function of the workpiece as well as the sealing tool parameters, thus allowing a substantially reproducible sealing quality to be easily achieved in the entire region of the sealed area. This considerably increases the process reliability while at the same time clearly reducing scrap-related costs.

Furthermore, according to the invention it is provided that the experimental determination of the compressive force $\sigma_{DS}$ required for the defined penetration depth of a body having a known geometry into the foil composite occurs independently from the sealing machine in a separate measuring machine. This is associated with the advantage that the measured values required for defining the corrugated geometry can be collected independently from the operation of the sealing machine as well as the installation location thereof. In addition to the resultant possibility of outsourcing the production of sealing tools, sealing tools that are custom made for the workpieces can be manufactured. Furthermore, the selection of sealing tools suitable for the respective task can be easily determined before installing them in the sealing machine. The measuring process, which is independent from the sealing machine, additionally provides a cost advantage since small foil samples suffice for these measurements.

According to the invention, it is furthermore provided that, based on the spacing of the bumps of a first sealing tool at the sealing temperature, the spacing of the bumps of another sealing tool at the production temperature is defined such that the spacing at the sealing temperature thereof corresponds to the spacing of the bump of the first sealing tool. The advantage associated therewith is that at the time of the sealing process, during which the sealing tools are typically heated to different temperatures, a set of sealing tools is available that have is identical arrangements of the bumps on the side facing the foil. When appropriately positioning the sealing tools on the associated tool holders, a mirror-image arrangement of the bumps in relation to the plane of the foil, meaning bumps disposed exactly opposite each other, is achieved and with this a defined load transfer as well as defined temperature conditions on comparable foil regions. This creates an overall uniform sealing pattern with further improved sealing quality.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
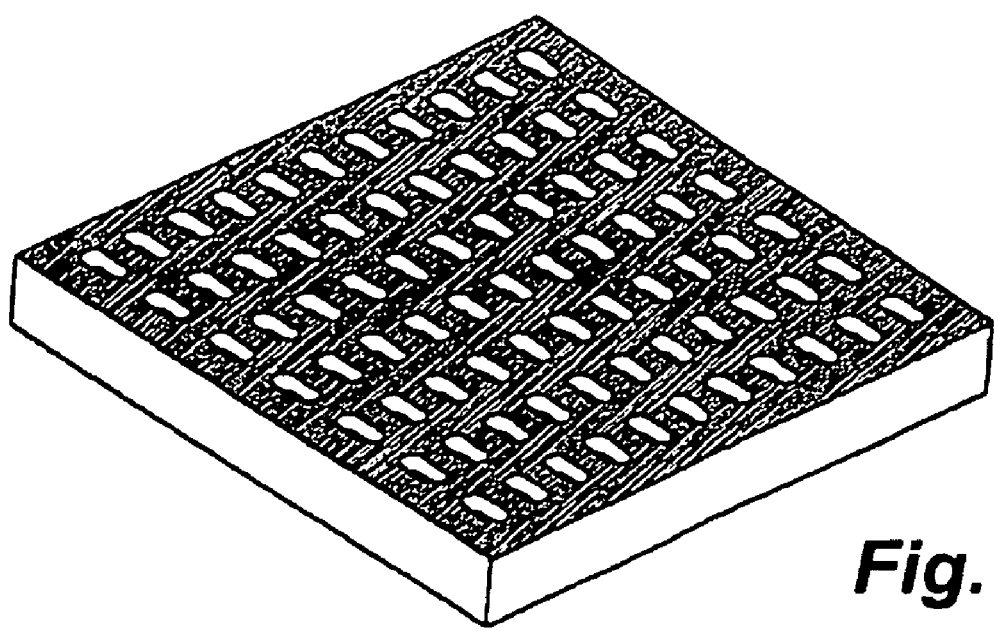
FIG. 1 is a perspective view of a sealing tool according to the invention.
Figure 2:
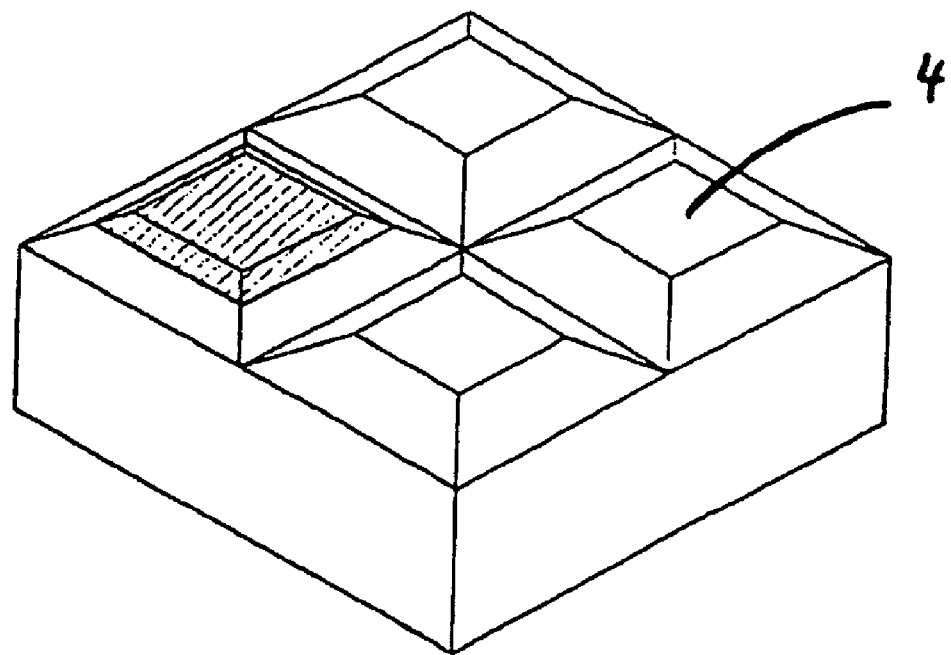
FIG. 2 is a large-scale view of a detail of the tool.
Figure 3:
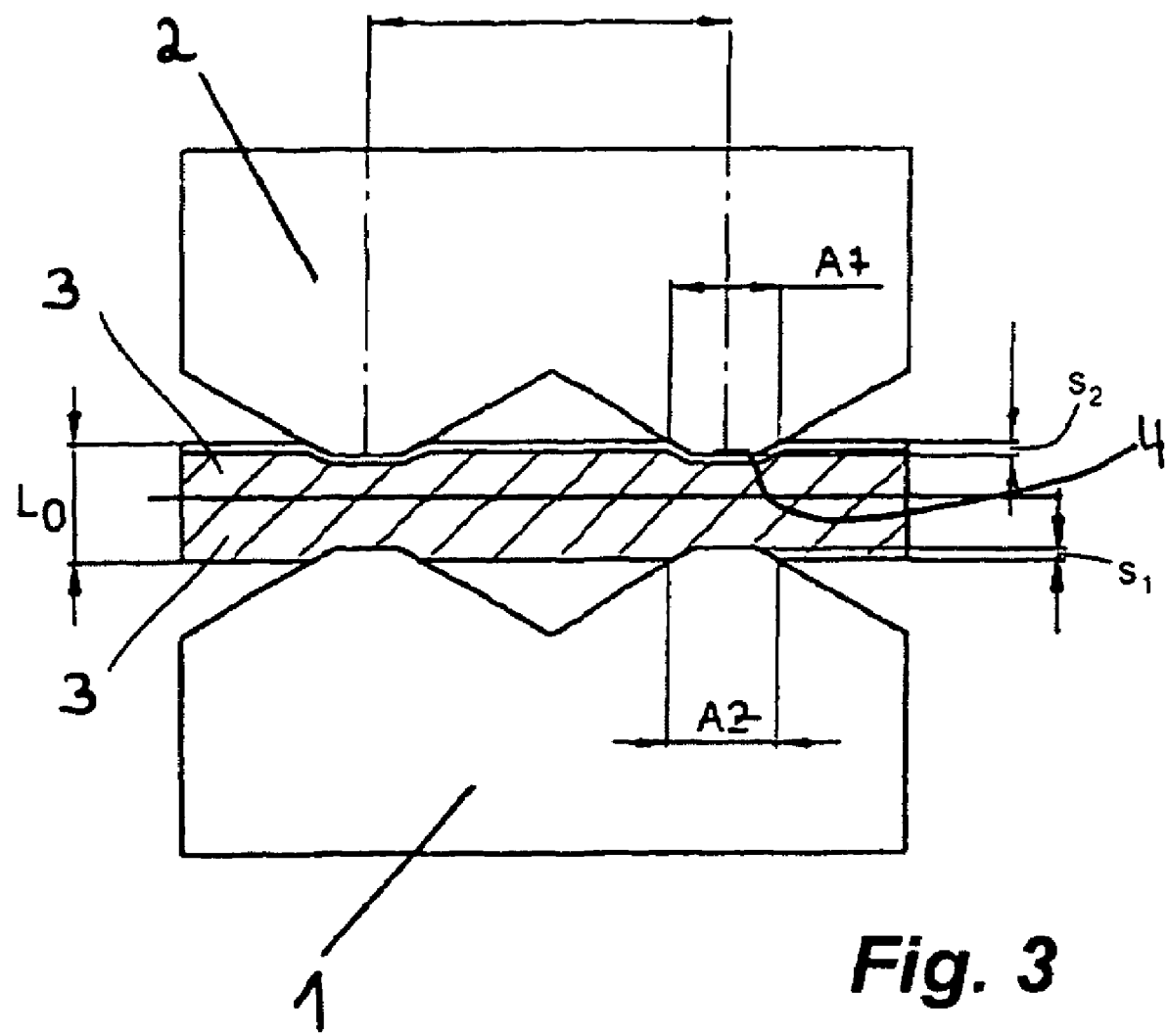
FIG. 3 is a partly schematic vertical section through a sealing machine having tools in accordance with the invention.

As seen in FIG. 3, sealing tools 1 and 2 used in a sealing machine, particularly in a thermoforming machine, where two foils 3 are guided between the tools 1 and 2 that have on is faces facing the foil 3 arrays of bumps 4 separated by a uniform center-to-center spacing T. The tolerances between the sealing tools 1 and 2 and the foil 3 are compensated for by the defined penetration depths s1 and s2 of the mutually opposing bumps 4. The extent of the tolerance compensation is a function of the penetration depths s1 and s2. In the formula $$(s_1 + s_2) = (\sigma_{Ds1} + \sigma_{Ds2})(L_0/E)$$

where $L_0$=the thickness of the foils and E=the modulus of elasticity of the foil, the compressive force values $\sigma_{Ds1}$ and $\sigma_{Ds2}$ of the bumps 4 represent the only parameters that can be varied by changing the pressure $\sigma_d$ applied by the sealing machine. The experimental determination of the compressive force $\sigma_{Ds}$ is done by measuring the compressive force required for the predetermined penetration depth of a test body having a known geometry into the foils. When using the compressive force $\sigma_d$ applied by the sealing machine, which is the quotient of the force applied to the sealing tools 1 and 2 per surface unit of measure of the sealing tools 1 and 2, according the relation $$A=\sigma_D*T^2/\sigma_{Ds}$$

the bump surface A required for the defined penetration depth can be determined. Since the bumps of a sealing tool 1 and 2 generally have identical areas and geometries, the bump surface determined this way is true for all bumps 4 provided on the surface of the sealing tool 1 and 2.

The experimental determination of the compressive force $\sigma_{Ds}$ required for the defined penetration depth of a body having a known geometry into the foil composite can be carried out apart from the sealing machine in a separate measuring machine. As a result, the geometry of the bumps 4 can be determined and the sealing tools 1 and 2 can be produced in a different location than the installation location of the sealing machine, on the one hand, and the selection of the sealing tools 1 and 2 suited for sealing a defined foil composite can be made before starting the sealing process and before producing rejects, on the other hand. Within the scope of quality assurance, furthermore the correct selection of the sealing tolls can be examined and verified again when problems occur in the sealing surface region. Furthermore, different batches of the workpieces processed in the sealing machine, in this case the foils 3, can be easily examined in terms of comparable properties such as thickness and the modulus of elasticity with respect to the sealing results to be expected.

Since the sealing tools 1 and 2 involved in the sealing process typically have different temperatures when performing the sealing operation, taking the expected thermal expansion values of the sealing tools 1 and 2 into consideration in the production process is particularly advantageous. Based on the spacing of the bumps of a first sealing tool at the sealing temperature thereof, the spacing of the bumps of the other sealing tool at the production temperature is therefore suitably set such that the spacing at the sealing temperature thereof corresponds to the spacing of the bumps of the first sealing tool. With appropriate adjustment of the sealing tools heated for performing the sealing operation on the associated tool holders, this allows precise mirror-image arrangement of the bumps in relation to each other regarding the plane of the foil. As a result, load and heat are transferred in defined regions of the foil composite, allowing a uniform and high-quality sealing pattern across the entire sealing surface.

We claim:

1. A method of making a sealing tool for a sealing machine having two such tools that have confronting faces, the method comprising the steps of:

forming each of the faces with an array of bumps separated by a uniform spacing T and each having an area A, whereby in use two of the tools are heated and pressed together at an operating pressure $\sigma_d$ against outer faces of a pair of thermoplastic foils so that the bumps penetrate to a predetermined depth into the respective outer faces for a sealing operation;

pressing a test tool having bumps at the uniform spacing and of predetermined size against a trial foil workpiece;

determining a pressure $\sigma_{Ds}$ necessary to press the bumps into the foil workpiece to the predetermined depth; and setting the area A of the tool equal to $$A=\sigma_D*T^2/\sigma_{Ds}.$$

2. The method defined in claim 1 wherein the pressing of the test tool is conducted away from the sealing machine.

3. A method of making a sealing tool for a sealing machine having two such tools that have confronting faces, the method comprising the steps of:

forming each of the faces with an array of bumps separated by a uniform spacing T and each having an area A, whereby in use two of the tools are heated and pressed together at an operating pressure $\sigma_d$ against outer faces of a pair of thermoplastic foils so that the bumps penetrate to a predetermined depth into the respective outer faces for a sealing operation;

pressing a test tool having bumps at the uniform spacing and of predetermined size against a trial foil workpiece;

determining a pressure $\sigma_{Ds}$ necessary to press the bumps into the foil workpiece to the predetermined depth;

setting the area A of each of the two tools equal to $$A=\sigma_D*T^2/\sigma_{Ds};$$

heating the tools to different temperatures and taking a difference between thermal expansions of the tools into account; and adjusting their spacing T at manufacturing temperature such that in use the spacings T are identical.

* * * * *